United States Patent
Fischer et al.

(10) Patent No.: US 10,939,163 B2
(45) Date of Patent: Mar. 2, 2021

(54) METHOD FOR WATERMARKING ENCRYPTED DIGITAL CONTENT, METHOD AND DEVICE FOR RETRIEVING A UNIQUE IDENTIFIER FROM WATERMARKED CONTENT AND CONTENT DISTRIBUTION NETWORK

(71) Applicant: NAGRAVISION S.A., Cheseaux-sur-Lausanne (CH)

(72) Inventors: Jean-Bernard Fischer, Rochejean (FR); Brecht Wyseur, Echallens (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 53 days.

(21) Appl. No.: 15/774,671

(22) PCT Filed: Nov. 10, 2016

(86) PCT No.: PCT/EP2016/077306
§ 371 (c)(1),
(2) Date: May 9, 2018

(87) PCT Pub. No.: WO2017/081177
PCT Pub. Date: May 18, 2017

(65) Prior Publication Data
US 2018/0332323 A1    Nov. 15, 2018

(30) Foreign Application Priority Data
Nov. 12, 2015    (EP) .................................... 15194311

(51) Int. Cl.
*G06F 21/16*    (2013.01)
*H04N 21/4405*    (2011.01)
(Continued)

(52) U.S. Cl.
CPC ......... *H04N 21/4405* (2013.01); *G06F 21/16* (2013.01); *H04N 19/467* (2014.11);
(Continued)

(58) Field of Classification Search
CPC ............. G06F 21/16; G06F 2221/0733; H04L 2209/608; H04N 2005/91335; H04N 19/467; H04N 21/8358
See application file for complete search history.

(56) References Cited

U.S. PATENT DOCUMENTS

| 2003/0161473 A1 | 8/2003 | Fransdonk |
| 2003/0165253 A1* | 9/2003 | Simpson ............... G06T 1/0021 382/100 |

(Continued)

FOREIGN PATENT DOCUMENTS

| EP | 2 605 536 A1 | 6/2013 |
| EP | 2 797 333 A1 | 10/2014 |

(Continued)

OTHER PUBLICATIONS

Subramanyam et al., "Robust Watermarking of Compressed and Encrypted JPEG2000 Images", pp. 703-716 (Year: 2012).*

(Continued)

*Primary Examiner* — Thaddeus J Plecha
(74) *Attorney, Agent, or Firm* — Oblon, McClelland, Maier & Neustadt, L.L.P.

(57) ABSTRACT

A method for watermarking an encrypted digital content stored in a content distribution network (CDN) method comprises the steps of receiving in the CDN, a non-watermarked encrypted content and marking metadata, said non-watermarked encrypted content being the result of an encryption of a non-watermarked clear content by a stream cipher process, said marking metadata indicating locations in the content suitable for a modification of said content;

(Continued)

using a watermark formed of watermark values and corresponding to a unique identifier; and producing a watermarked encrypted content by combining in the CDN, with a combination function, the values forming the watermark with the non-watermarked encrypted content in locations indicated by the marking metadata.

15 Claims, 3 Drawing Sheets

(51) Int. Cl.
 *H04N 21/8355* (2011.01)
 *H04N 21/6334* (2011.01)
 *H04N 21/8358* (2011.01)
 *H04N 19/467* (2014.01)
 *H04N 5/913* (2006.01)

(52) U.S. Cl.
 CPC ..... *H04N 21/6334* (2013.01); *H04N 21/8355* (2013.01); *H04N 21/8358* (2013.01); *G06F 2221/0733* (2013.01); *H04L 2209/608* (2013.01); *H04N 2005/91335* (2013.01)

(56) References Cited

U.S. PATENT DOCUMENTS

| | | | |
|---|---|---|---|
| 2003/0187798 A1* | 10/2003 | McKinley | G06Q 40/04 705/50 |
| 2003/0204727 A1* | 10/2003 | Sasaki | G06F 21/16 713/176 |
| 2007/0110237 A1 | 5/2007 | Tehranchi et al. | |
| 2008/0002854 A1* | 1/2008 | Tehranchi | G06F 21/10 382/100 |
| 2008/0022113 A1* | 1/2008 | Moskowitz | G06T 1/0028 713/176 |
| 2010/0100742 A1* | 4/2010 | Courington | H04N 21/4181 713/176 |
| 2011/0129116 A1* | 6/2011 | Thorwirth | H04N 19/467 382/100 |
| 2013/0148843 A1* | 6/2013 | Doerr | G06T 1/0021 382/100 |
| 2013/0318550 A1* | 11/2013 | Geyzel | G06T 1/0028 725/25 |
| 2015/0016663 A1 | 1/2015 | Tehranchi et al. | |
| 2015/0063567 A1* | 3/2015 | Robert | H04N 1/32144 380/205 |
| 2015/0356281 A1* | 12/2015 | Van Deventer | G06F 21/16 713/176 |
| 2016/0080831 A1 | 3/2016 | Hunacek et al. | |
| 2016/0088366 A1 | 3/2016 | Hunacek et al. | |
| 2016/0365973 A1* | 12/2016 | van Deventer | H04L 9/008 |

FOREIGN PATENT DOCUMENTS

| | | |
|---|---|---|
| EP | 2 797 335 A1 | 10/2014 |
| WO | WO 01/98903 A1 | 12/2001 |

OTHER PUBLICATIONS

International Search Report dated Feb. 10, 2017 in PCT/EP2016/077306, 3 pages.

\* cited by examiner

CDN

METHOD FOR WATERMARKING ENCRYPTED DIGITAL CONTENT, METHOD AND DEVICE FOR RETRIEVING A UNIQUE IDENTIFIER FROM WATERMARKED CONTENT AND CONTENT DISTRIBUTION NETWORK

TECHNICAL FIELD

According to an embodiment, it is proposed a method for watermarking an encrypted digital content, said encrypted content being stored in a content distribution network which has limited processing capacities. In such a Content Distribution Network, due to the low processing capacities, it is not possible or not desirable to encrypt a content within the content distribution network.

According to another embodiment, it is proposed a method for retrieving a unique identifier from a watermarked clear content said watermarked clear content being the result of a decryption of an encrypted content watermarked according to the above mentioned method for watermarking an encrypted digital content.

According to still another embodiment, it is proposed a content distribution network adapted to produce a watermarked encrypted content. A further embodiment proposes a device for retrieving a unique identifier from a watermarked clear content, said watermarked clear content being the result of a decryption of an encrypted content watermarked according to the above mentioned method for watermarking an encrypted digital content.

BACKGROUND ART

In the context of content distribution, for example of content distribution of conditional access content, a content distribution network (CDN) is often used. Such a content distribution network is a repository for the content files. The content files are generally encrypted, each with one or several keys, but the keys used do not depend on the receiver or on a user. In other words, for a given content, each receiver receives the same encrypted file. Accordingly, there is no way to trace the files once they are sent to numerous receivers. From a file downloaded from the internet, it is not possible to find the original receivers to which it was sent by the Content Distribution Network.

A solution allowing for a content file to be traced could be provided by encrypting the files with keys pertaining to the receiver or to the user to which the file is sent. This would imply that the content distribution network should contain the keys pertaining to the receivers and/or to the users. As a content distribution network is not considered as a secure environment, it is not acceptable to make such keys available.

Moreover, usually, a content distribution network has a limited amount of processing capability and computer power shall be limited anyway. Thus, a conventional CDN would not be able to encrypt content on the fly. Providing additional processing capacities to a CDN in order to enable on the fly encryption would be prohibitively expensive and not optimal from a security point of view.

For these reasons, it is not possible to insert in a clear content, a specific mark which is unique to each receiver, in order to trace the content and to further encrypt the marked content.

Therefore, there is a need for a solution allowing for content distributed by a content distribution network to be watermarked, while taking into account the constraints of these CDN, i.e. the limited processing capabilities and the lack of security.

SUMMARY

It is hereby proposed to solve the drawbacks of the prior art by proposing a method allowing for an encrypted content, distributed to receivers by a content distribution network (CDN), to be watermarked. It is also proposes a method for retrieving a user identifier from clear content which has been watermarked according to the above mentioned method.

It is further proposed a content distribution network adapted to produce a watermarked encrypted content as well as a device capable of retrieving a unique identifier from a watermarked clear content.

An object is achieved by a method for watermarking an encrypted digital content as defined in the preamble and comprising the steps of:
 receiving, in the content distribution network, a non watermarked encrypted content and marking metadata, said non watermarked encrypted content being the result of an encryption of a non watermarked clear content by a stream cipher process, said marking metadata indicating locations in the content suitable for a modification of said content;
 using a watermark formed of watermark values and corresponding to a unique identifier;
 producing a watermarked encrypted content by combining, in the content distribution network, with a combination function, the values forming the watermark with the non watermarked encrypted content in locations indicated by the marking metadata.

Another object is achieved by a method for retrieving a unique identifier from a watermarked clear content, said watermarked clear content being the result of a decryption of an encrypted content watermarked according to the above mentioned method for watermarking an encrypted content, said method for retrieving the unique identifier comprising the steps of:
 combining the watermarked clear content with the non watermarked clear content in the locations indicated by the marking metadata, in order to obtain the watermark;
 applying an operation on the watermark to obtain the unique identifier, said operation being a reverse of the operation allowing for the watermark to be obtained from the unique identifier.

A further object is achieved by a content distribution network adapted to:
 receive a non watermarked encrypted content and marking metadata, said non watermarked encrypted content being the result of an encryption of a non watermarked clear content by a stream cipher process, said marking metadata indicating locations in the content suitable for a modification of said content;
 use a watermark formed of watermark values and corresponding to a unique identifier;
 produce a watermarked encrypted content by combining, with a combination function, the values forming the watermark with the non watermarked encrypted content in locations indicated by the marking metadata.

Still a further object is achieved by a device for retrieving a unique identifier from a watermarked clear content, said watermarked clear content being the result of a decryption of an encrypted content watermarked according to the above mentioned method for watermarking an encrypted content, said retrieving device being adapted to:
- receive a watermarked clear content;
- receive a corresponding non watermarked clear content;
- receive marking metadata corresponding to said watermarked clear content;
- combine the watermarked clear content with the non watermarked clear content in locations indicated by the marking metadata, in order to obtain the watermark;
- apply an operation on the watermark to obtain the unique identifier, said operation being a reverse of the operation allowing for the watermark to be obtained from the unique identifier.

A Content Distribution Network (CDN) to which limited additional processing capacities may be added can be used in order to enable marking a content in such a way that it is possible to retrieve a unique identifier from a content. The CDN however is able to distribute content that can be made specific to the receiver to which these contents are provided.

According to an embodiment of the methods described, the CDN receives conventional encrypted files intended for distribution to users. These files are encrypted by keys that are independent from the final users. The CDN also receives data that is specific to the users. This user specific data is used to personalize the content files. The personalization is done by the CDN. However, it does not require extensive encryption or processing capacities. Therefore, a CDN with limited additional processing capacities can be used.

As the CDN receives encrypted content files and as the keys used to encrypt or decrypt these files are not known to the CDN, there is no risk of disclosure of secret keys associated with the protection of the files.

BRIEF DESCRIPTION OF DRAWINGS

Different embodiments and their advantages will be better understood with reference to the enclosed drawings and to the detailed description, in which.

DETAILED DESCRIPTION

Figure 1:
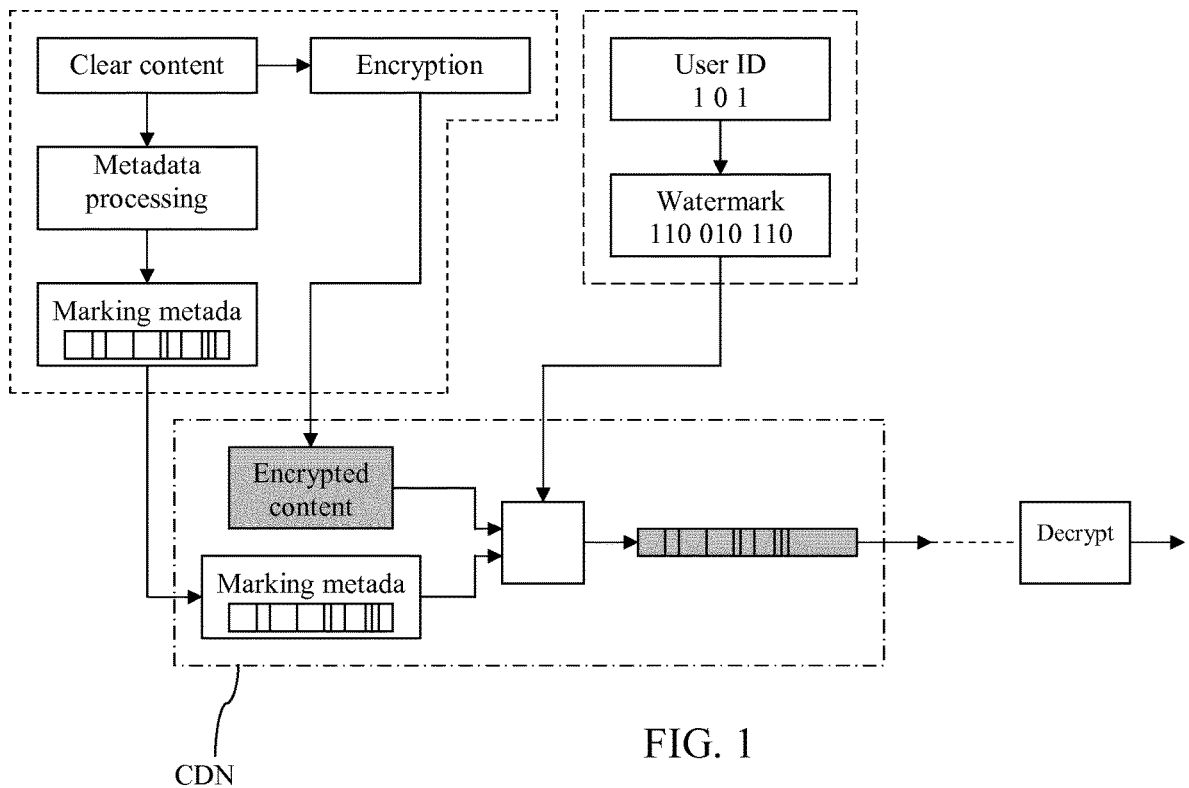
FIG. 1 schematically discloses a method for marking an encrypted content.
Figure 2:
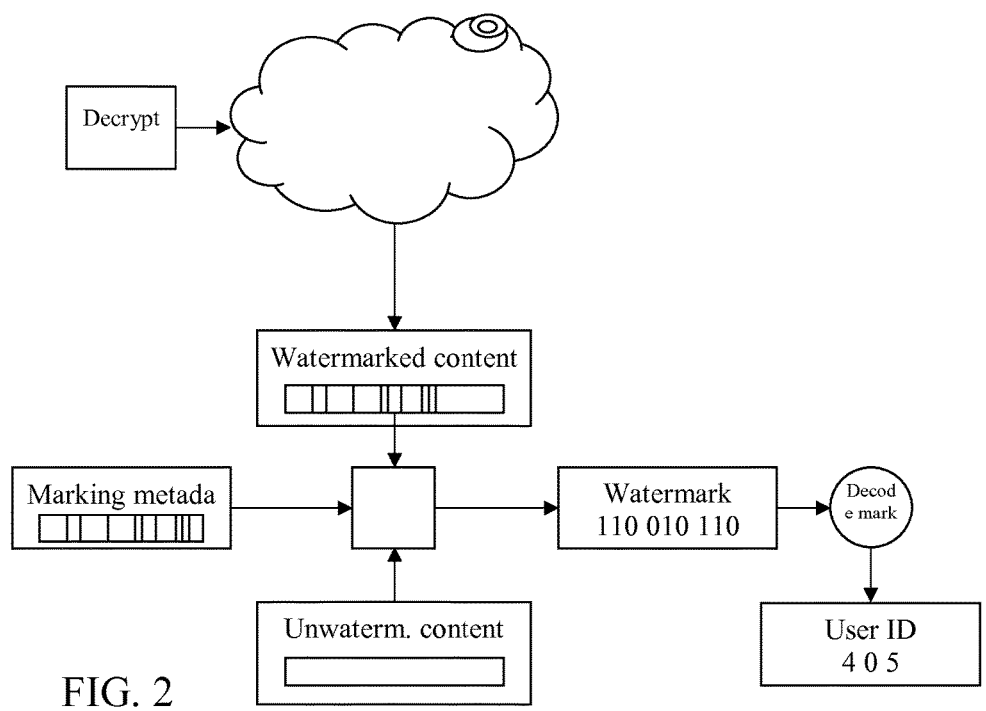
FIG. 2 discloses a method for retrieving a unique identifier.

FIG. 1 illustrates the method for watermarking an encrypted content. FIG. 2 illustrates the method for retrieving a unique identifier from a content marked according to the method illustrated by FIG. 1. In the embodiment illustrated, the content is watermarked with a mark depending on a user identifier, said user identifier being in principle unique and different for different user devices. The watermark described in the present description could also be dependent on the content itself and/or on the content distribution network. In all the cases, it is referred to herein as "unique identifier".

A user identifier could be the same for several receivers belonging to a same user, or on the contrary, each receiver could have a different user ID. It is also possible that some receivers of a user have the same user ID and that some receivers belonging to the same user have different user IDs.

Prior to transmitting content to the Content Distribution Network (CDN), a certain amount of processing is performed by a management center. The corresponding steps are referred to as "pre-processing". During this pre-processing, clear content is encrypted by a content encryption key. The encryption uses a stream cipher encryption mode such as for example AES-CTR (Advanced Encryption Standard block cipher in CounTeR mode). The reason why such a stream cipher mode is used will be explained below. It should be noted that virtually any stream cipher process could be used herein.

The clear content is also analyzed to identify regions in the content where the modification of a value of the content will not have an important effect during the rendering of the content. The expression "does not have an important effect" can be understood herein as meaning that the content can be visualized by a user without this user being disturbed by the effect. The effect can be invisible or hardly visible for example, or it can affect the rendering in a place where the user is not disturbed. Such analyses methods are known from the man skilled in the art and are therefore not further disclosed in detail in the present description. These methods are essentially used in the field of watermarking.

This content analysis, referred to as "Metadata processing" in FIG. 1, results in marking metadata. This marking metadata can take the form of a bitmap indicating locations in the content, wherein a change of a value of the corresponding bit has little impact.

Figure 4:
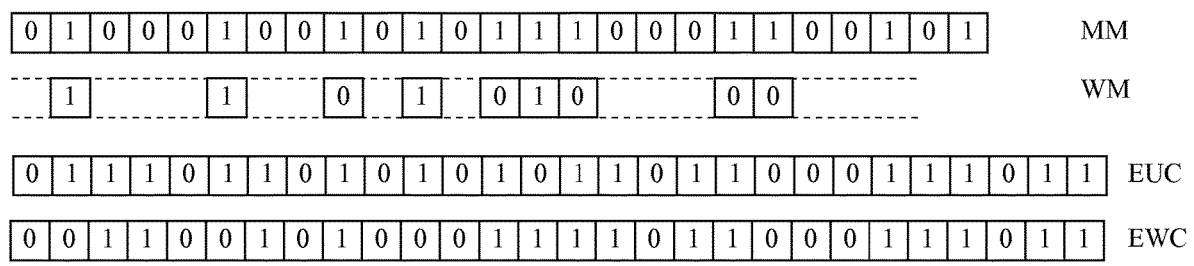
FIG. 4 illustrates data used in the watermarking method.
Figure 5:
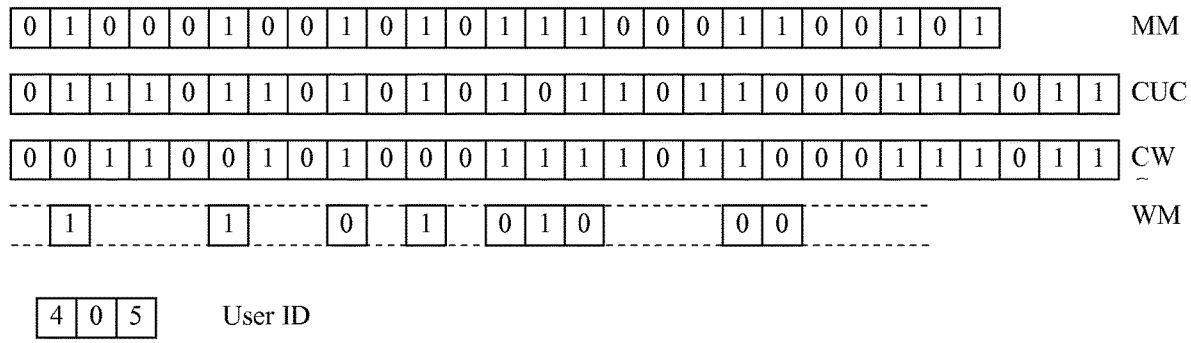
FIG. 5 illustrates data used in a method for retrieving a watermark.

Such a bitmap is illustrated in FIGS. 4 and 5. A value "0" in the bitmap indicates that the corresponding location of the content is not suitable for a modification and a value "1" in the bitmap indicates that the corresponding location in the content is suitable for a modification.

The bitmap and/or the content comprise means for synchronizing or aligning the marking metadata and the encrypted content.

When this pre-processing is complete, the encrypted content and the marking metadata may be sent to the CDN.

When a user unit requests a content, a processing of the user identifier is performed. A request is sent by the user unit to a management center or to a content provider, said request containing at least the user identifier and an identifier of the requested content. The processing of the user identifier is usually not performed in the CDN, but rather in a management center which can be the same as the management center processing the content, or another management center. During this user ID processing, a user identifier is processed to obtain a watermark. Usually, each bit of the user ID is converted to a sequence of bits. The sequence can depend on a table and several different sequences can correspond to a same value of one digit of the user ID.

Figure 3:
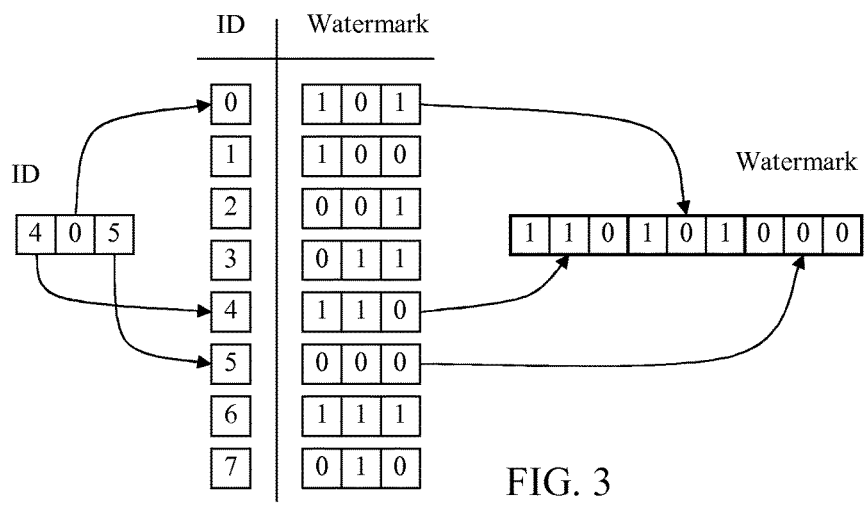
FIG. 3 schematically discloses a preparation step of a watermarking method.

In FIG. 3, an example of a conversion of a user ID in a watermark is illustrated. In this example, the user ID is 405. The first digit of the user ID is converted according to a table. Here, the first digit "4" is converted in 110 according to the table. The second digit of the user ID, "0", is converted in 101. The third digit of the user ID, "5" is converted into 000. Thus, the user ID "405" is converted in 110101000. It is clear that the number of digits of a user ID is usually greater than three. In this example, one digit of the user ID is converted into three bits. Usually, one digit is converted into more than three bits. The user ID can be formed of values such as for example numbers from 0 to 9 or even other characters such as letters or signs.

Other methods could be used to convert a user ID in a watermark, such as for example encryption. One constraint is that it should be possible to determine which user ID corresponds to which watermark.

As mentioned above, the conversion of the unique identifier in a watermark is usually not performed by the CDN. However, according to another embodiment, the conversion could be done in a CDN, as it does not require great processing capacities. Thus, obtaining a watermark by a content distribution network could mean either that the CDN receives the watermark and the unique identifier from an external provider or that the CDN receives the unique identifier and calculates the watermark.

The watermark can be stored with the unique identifier in a memory of the management center or of the CDN or it can be calculated on the fly by the management center or the CDN.

When a specific content has to be sent to a specific user unit or receiver, having a specific user ID, the CDN chooses the corresponding encrypted specific content and the corresponding marking metadata. The CDN also retrieves or calculates the corresponding watermark depending on the user ID of the user requesting the content. The watermark is then introduced by the CDN, in the encrypted content, in the locations indicated by the marking metadata. As mentioned above, the clear non watermarked content is encrypted by a stream cipher process. The marking metadata indicates locations where a watermark can be introduced or more generally, where a modification of a value of the corresponding bit does not affect the rendering of the content. A way to introduce the watermark is to combine this watermark with the encrypted content, in the locations indicated by the marking metadata. As a stream cipher process is used, it is possible to use a quite simple combination function for combining the encrypted content with the watermark. A suitable combination is a XOR function.

An example of this combination is illustrated by FIG. 4. In this figure, the marking metadata MM indicates, by a value of "1", that the corresponding bit of the content can be changed or is suitable for a modification, and by a value of "0" that the corresponding bit of the content should not be changed or is not suitable for a modification.

The line WM illustrates the values of the watermark obtained by processing the user ID, each bit of the watermark being aligned with a bit having a value of "1" in the marking metadata MM.

The third line of FIG. 4 illustrates the encrypted unmarked content EUC, as received by the CDN after the preprocessing of the content.

The last line of FIG. 4 illustrates the encrypted watermarked content EWC. This watermarked content is obtained by a combination of the encrypted unmarked content EUC with the line noted WC. For example, the first bit of the watermark, "1" is combined with the corresponding bit "1" of the encrypted unmarked content EUC, to obtain the value "0". Here, the combination is a XOR function.

In the locations where the marking metadata contains the value 0, the encrypted content is not modified.

This results in an encrypted content, watermarked according to a user's specific identifier.

When a user receives such an encrypted watermarked content, he/she can decrypt it if he/she has the required elements. These elements are in particular the decryption key(s) and the rights to decrypt the content.

As explained above, a content is first encrypted and then modified by adding a watermark. In order to enable a user to use the content, the user has to decrypt the watermarked content. The encryption method must be chosen in such a way that the decryption of an encrypted watermarked content results in a usable clear watermarked content i.e. the encryption and watermarking operations must be chosen such that the decryption operation maintains the watermark. The stream cipher encryption methods fulfill this requirement. More specifically, if a content is encrypted with a stream cipher method and then watermarked, the decryption of this content with the corresponding keys will result in a watermarked clear content.

Once decrypted, the result of the decryption can be used, and in particular, if the content is an audio video file, it can be visualized on a suitable rendering device.

If a user decrypts a content and makes this contain available, for example on a file exchange platform, the method described enables retrieving the watermark and consequently the user identifier. This can be done by a management center or a center in charge of security, which has the non-watermarked clear content or in other words, the original content. This security center also has to know the marking metadata. It should be noted that this marking metadata is usually unique and different for each content, but is independent from the receivers.

In order to determine the watermark, the security center has to combine the clear watermarked content CWC, i.e. the content distributed on the file exchange platform, and the non watermarked clear content or unmarked clear content UCC in the locations indicated by the marking metadata MM. This combination is the reverse operation of the combination used in the CDN. If a XOR function is used in the CDN, a XOR function will also be used in the security center.

This operation is illustrated by FIG. 5. The first line of FIG. 5 illustrates the marking metadata MM. This marking metadata depends on the content and is known to the security center. The second line of FIG. 5 illustrates the clear unmarked content CUC. This content is also known to the security center. The third line of FIG. 5 corresponds to the clear watermarked content EWC. This content is the one obtained from the file exchange platform.

Figure 6:
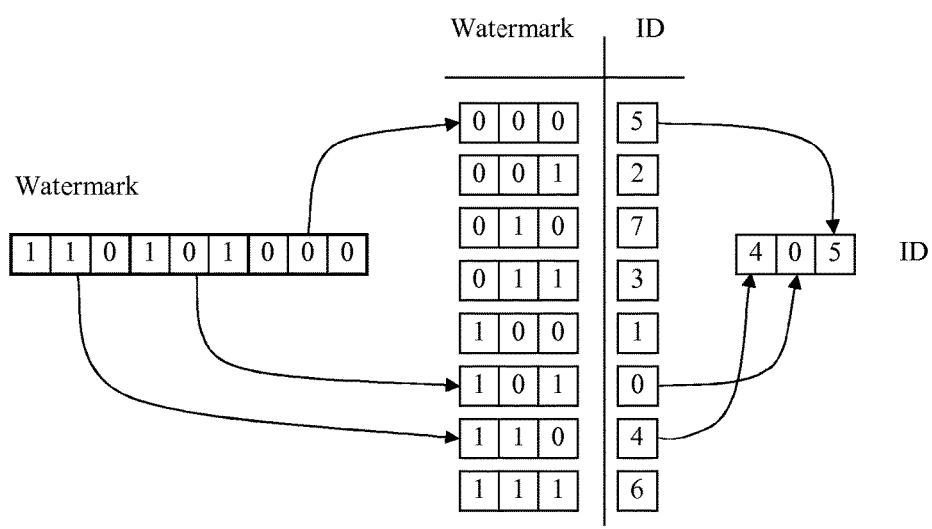
FIG. 6 illustrates the retrieval of a unique identifier from a watermark.

Once both watermarked and non watermarked clear content are available, both contents are combined, in the locations indicated by the marking metadata, i.e. in the locations where the marking metadata contains a value of "1". The combination is the operation reverse to the operation having been used during the watermarking step. In the example described, the combination is a XOR function. The result of this combination is the watermark. In the example, the value of the watermark obtained by this combination is 110101000. The watermark is converted in a user ID according to the table illustrated by FIG. 6. The three third bits of the watermark "110" are converted by the table in one digit "4". The next three bits are converted in a "0" by the table and the three last bits are converted in a "5". The ID corresponding to the watermark is thus 405.

In the example illustrated and described, the conversion of the user ID in a watermark is a reversible operation. This means that the watermark can be calculated from the user ID and that the user ID can be calculated from the watermark. The watermark could also be calculated with an irreversible operation such as for example a hash function. The user ID can be hashed to obtain the watermark. When a watermark is retrieved from a content file distributed on a file exchange platform, as the hash function is irreversible, it is not possible to calculate the user ID. However, it is possible to compare the watermark with the hash of all of the registered user IDs.

The watermark can be redundant in the content. Thus, if the watermark is corrupt, it can still be detected and used to retrieve the corresponding user ID. An error correction code can also be contained in the watermark.

According to this method, the user ID of a user having made a content available on a file exchange platform can be detected. This could be used for example for implementing countermeasures.

In the description, the unique identifier is mainly described as a user unit identifier. However, such a unique identifier could be linked to a content or a content distribution network.

Although embodiments of the present disclosure have been described with reference to specific example embodiments, it will be evident that various modifications and changes may be made to these embodiments without departing from the broader scope of these embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived there from, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A method for watermarking an encrypted digital content by a content distribution network, said method comprising:
   receiving, in the content distributing network, a non-watermarked encrypted content and marking metadata, said non-watermarked encrypted content being a result of an encryption of a non-watermarked clear content by a stream cipher process, said marking metadata indicating locations in the non-watermarked encrypted content suitable for a modification of said non-watermarked encrypted content, said marking metadata including a bitmap of the locations in the non-watermarked encrypted content where the non-watermarked encrypted content can be modified, each bit in the bitmap aligning with a corresponding bit in the non-watermarked encrypted content;
   using a watermark formed of watermark values and corresponding to a unique identifier; and
   producing a watermarked encrypted content by combining in the content distribution network, with a combination function, the watermark values forming the watermark with the non-watermarked encrypted content in the locations indicated by the marking metadata.

2. The method for watermarking an encrypted content according to claim 1, wherein the non-watermarked clear content corresponding to said non-watermarked encrypted content is encrypted by an advanced encryption standard block cipher process.

3. The method for watermarking an encrypted content according to claim 1, wherein the combination between the watermark values forming the watermark and the non-watermarked encrypted content uses a logical function.

4. The method for watermarking an encrypted content according to claim 1, wherein said marking metadata indicates the locations in the non-watermarked encrypted content, in which a watermark can be introduced, the locations indicated by the marking metadata being locations in which the modification of a value of the encrypted content does not produce a visible effect during rendering of watermarked clear content.

5. The method for watermarking an encrypted content according to claim 1, wherein the watermark contains an error correction code.

6. The method for watermarking an encrypted content according to claim 1, wherein the unique identifier is redundant in the watermark.

7. The method for watermarking an encrypted content according to claim 1, wherein the unique identifier is a unique identifier of a user device requesting said encrypted digital content.

8. The method for watermarking an encrypted content according to claim 1, wherein the unique identifier is a unique identifier of a content.

9. The method for watermarking an encrypted content according to claim 1, wherein the unique identifier is a unique identifier of a content distribution network.

10. A method for retrieving the unique identifier from a watermarked clear content, said watermarked clear content being a result of a decryption of an encrypted content watermarked according to the method of claim 1, said method for retrieving the unique identifier comprising:
    combining the watermarked clear content with the non-watermarked clear content in the locations indicated by the marking metadata, in order to obtain the watermark; and
    applying an operation on the watermark to obtain the unique identifier, said operation being a reverse of an operation allowing for the watermark to be obtained from the unique identifier.

11. The method according to claim 10, wherein the combination of the watermarked clear content with the non-watermarked clear content uses a logical function.

12. The method according to claim 10, wherein, prior to applying the operation on the watermark to obtain the unique identifier, an error correction code is performed.

13. A device for retrieving the unique identifier from a watermarked clear content, said watermarked clear content being a result of a decryption of an encrypted content watermarked according to the method of claim 1, said device comprising:
    an interface circuit configured to receive the watermarked clear content, receive a corresponding non-watermarked clear content, and receive marking metadata corresponding to said watermarked clear content; and
    a processor configured to combine the watermarked clear content with the non-watermarked clear content in locations indicated by the marking metadata, in order to obtain the watermark, and apply an operation on the watermark to obtain the unique identifier, said operation being a reverse of an operation allowing for the watermark to be obtained from the unique identifier.

14. A content distribution network comprising:

an interface circuit configured to:

receive a non-watermarked encrypted content and marking metadata, said non-watermarked encrypted content being a result of an encryption of a non-watermarked clear content by a stream cipher process, said marking metadata indicating locations in the non-watermarked encrypted content suitable for a modification of said non-watermarked encrypted content, said marking metadata including a bitmap of the locations in the non-watermarked encrypted content that can be modified, each bit in the bitmap aligning with a corresponding bit in the non-watermarked encrypted content; and a processor circuit configured to:

use a watermark formed of watermark values and corresponding to a unique identifier; and produce a watermarked encrypted content by combining, with a combination function, the watermark values forming the watermark with the non-watermarked encrypted content in the locations indicated by the marking data.

15. The content distribution network according to claim 14, wherein the combination of the values forming the watermark with the non-watermarked encrypted content in locations indicated by the marking metadata uses a logical function.

\* \* \* \* \*